(12) United States Patent
Viswanathan et al.

(10) Patent No.: US 10,826,883 B2
(45) Date of Patent: Nov. 3, 2020

(54) SYSTEMS AND METHODS FOR HOST SYSTEM MANAGEMENT OF AN INFORMATION HANDLING SYSTEM VIA A MOBILE INFORMATION HANDLING SYSTEM

(71) Applicant: Dell Products L.P., Round Rock, TX (US)

(72) Inventors: Ganesh Kuppuswamy Viswanathan, Round Rock, TX (US); Andrew W. Wilks, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 315 days.

(21) Appl. No.: 15/484,644

(22) Filed: Apr. 11, 2017

(65) Prior Publication Data

US 2018/0295012 A1 Oct. 11, 2018

(51) Int. Cl.
| | |
|---|---|
| *H04L 29/06* | (2006.01) |
| *H04L 12/24* | (2006.01) |
| *H04L 29/12* | (2006.01) |
| *H04W 12/06* | (2009.01) |

(52) U.S. Cl.
CPC ............ *H04L 63/08* (2013.01); *H04L 41/046* (2013.01); *H04L 61/2521* (2013.01); *H04W 12/06* (2013.01)

(58) Field of Classification Search
CPC .............................. H04L 12/189; H04L 41/042
See application file for complete search history.

(56) References Cited

U.S. PATENT DOCUMENTS

| | | | |
|---|---|---|---|
| 6,515,994 B1 | 2/2003 | Chuah et al. | |
| 8,176,168 B1 * | 5/2012 | Ramamurthy | G06F 11/0757 709/224 |
| 9,477,260 B2 | 10/2016 | Hartman et al. | |
| 9,495,997 B2 * | 11/2016 | Perusse, Jr. | G11B 17/228 |
| 9,541,976 B1 * | 1/2017 | Lambert | G06F 1/266 |
| 9,612,638 B1 * | 4/2017 | Berke | H02M 3/1584 |
| 10,225,095 B2 | 3/2019 | Ragupathi et al. | |
| 2007/0198634 A1 | 8/2007 | Knowles et al. | |
| 2009/0210601 A1 * | 8/2009 | Greenstein | H04L 69/32 710/305 |
| 2010/0070563 A1 | 3/2010 | Baker et al. | |
| 2010/0153807 A1 | 6/2010 | Kakani | |
| 2011/0080703 A1 | 4/2011 | Schlesener et al. | |
| 2012/0233628 A1 * | 9/2012 | Ling | G06F 9/54 719/328 |
| 2013/0247033 A1 | 9/2013 | Sawhney et al. | |
| 2014/0181891 A1 | 6/2014 | Von Bokern et al. | |
| 2014/0207902 A1 | 7/2014 | Joshi et al. | |

(Continued)

*Primary Examiner* — Shean Tokuta
(74) *Attorney, Agent, or Firm* — Jackson Walker L.L.P.

(57) ABSTRACT

In accordance with embodiments of the present disclosure, an information handling system may include a processor, a management controller communicatively coupled to the processor and configured to provide out-of-band management of the information handling system, and an interface for communicatively coupling the management controller to a second information handling system external to the information handling system for out-of-band management of the information handling system, wherein the management controller is further configured to enable communication between the second information handling system and an operating system executing on the processor.

19 Claims, 9 Drawing Sheets

(56) References Cited

U.S. PATENT DOCUMENTS

| | | | |
|---|---|---|---|
| 2014/0215030 A1 | 7/2014 | Terwilliger et al. | |
| 2014/0215458 A1* | 7/2014 | Devarapalli | G06F 3/0619 |
| | | | 718/1 |
| 2014/0277784 A1* | 9/2014 | Mick | H05K 7/1498 |
| | | | 700/286 |
| 2015/0024697 A1 | 1/2015 | Holtman | |
| 2015/0086017 A1* | 3/2015 | Taylor | H04L 9/14 |
| | | | 380/270 |
| 2015/0160960 A1* | 6/2015 | Delco | G06F 9/45545 |
| | | | 718/1 |
| 2015/0222517 A1 | 8/2015 | McLaughlin et al. | |
| 2016/0091871 A1 | 3/2016 | Marti et al. | |
| 2016/0315805 A1* | 10/2016 | Ragupathi | H05K 7/1498 |
| 2016/0366239 A1* | 12/2016 | Rabeela | H04L 67/2819 |
| 2017/0010899 A1* | 1/2017 | Dasar | G06F 9/4416 |
| 2017/0018149 A1* | 1/2017 | Shih | H05B 45/00 |
| 2017/0024353 A1* | 1/2017 | Bhatia | G06F 9/44505 |
| 2017/0076575 A1* | 3/2017 | Kunnathur Ragupathi | |
| | | | G06F 1/3287 |
| 2017/0078877 A1* | 3/2017 | Chudy | H04W 12/06 |
| 2017/0147361 A1* | 5/2017 | Kirvan | G06F 9/4406 |
| 2017/0230793 A1* | 8/2017 | Sugiyama | H04W 4/023 |
| 2018/0088639 A1* | 3/2018 | Remis | G06F 9/44505 |
| 2018/0307327 A1* | 10/2018 | Tran | H03M 11/00 |

* cited by examiner

SYSTEMS AND METHODS FOR HOST SYSTEM MANAGEMENT OF AN INFORMATION HANDLING SYSTEM VIA A MOBILE INFORMATION HANDLING SYSTEM

TECHNICAL FIELD

The present disclosure relates in general to information handling systems, and more particularly to systems and methods for coupling an information handling resource, such as a communications module, to an information handling system, in which the information handling resource is disposed in an information handling system bezel.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many typical server designs, a front portion of a server chassis often includes numerous hard disk drive bays for housing numerous modular hard disks. The information handling system industry is trending towards reducing the number of input/output (I/O) ports and control panel display surfaces on front panels of servers in order to allow more space for hard disk drive bays. In addition, recent advances allowing for wireless access to system management require a mechanical design of a server to provide space for a wireless interface and an associated antenna. However, for security reasons, many users may not desire a wireless interface to be present on a server.

SUMMARY

In accordance with the teachings of the present disclosure, the disadvantages and problems associated with provision of wireless communication access to an information handling system may be reduced or eliminated.

In accordance with embodiments of the present disclosure, an information handling system may include a processor, a management controller communicatively coupled to the processor and configured to provide out-of-band management of the information handling system, and an interface for communicatively coupling the management controller to a second information handling system external to the information handling system for out-of-band management of the information handling system, wherein the management controller is further configured to enable communication between the second information handling system and an operating system executing on the processor.

In accordance with these and other embodiments of the present disclosure, a method may include communicatively coupling a processor to a management controller configured to provide out-of-band management of an information handling system, communicatively coupling the management controller to a second information handling system external to the information handling system for out-of-band management of the information handling system via an interface, and enabling communication between the second information handling system and an operating system executing on the processor via the management controller.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in a first information handling system comprising a management controller communicatively configured to provide out-of-band management of the information handling system: (a) communicatively couple a host system processor of the first information handling system to the management controller configured to provide out-of-band management of the first information handling system; (b) communicatively couple the management controller to a second information handling system external to the first information handling system for out-of-band management of the first information handling system via an interface; and (c) enable communication between the second information handling system and an operating system executing on the host system processor via the management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
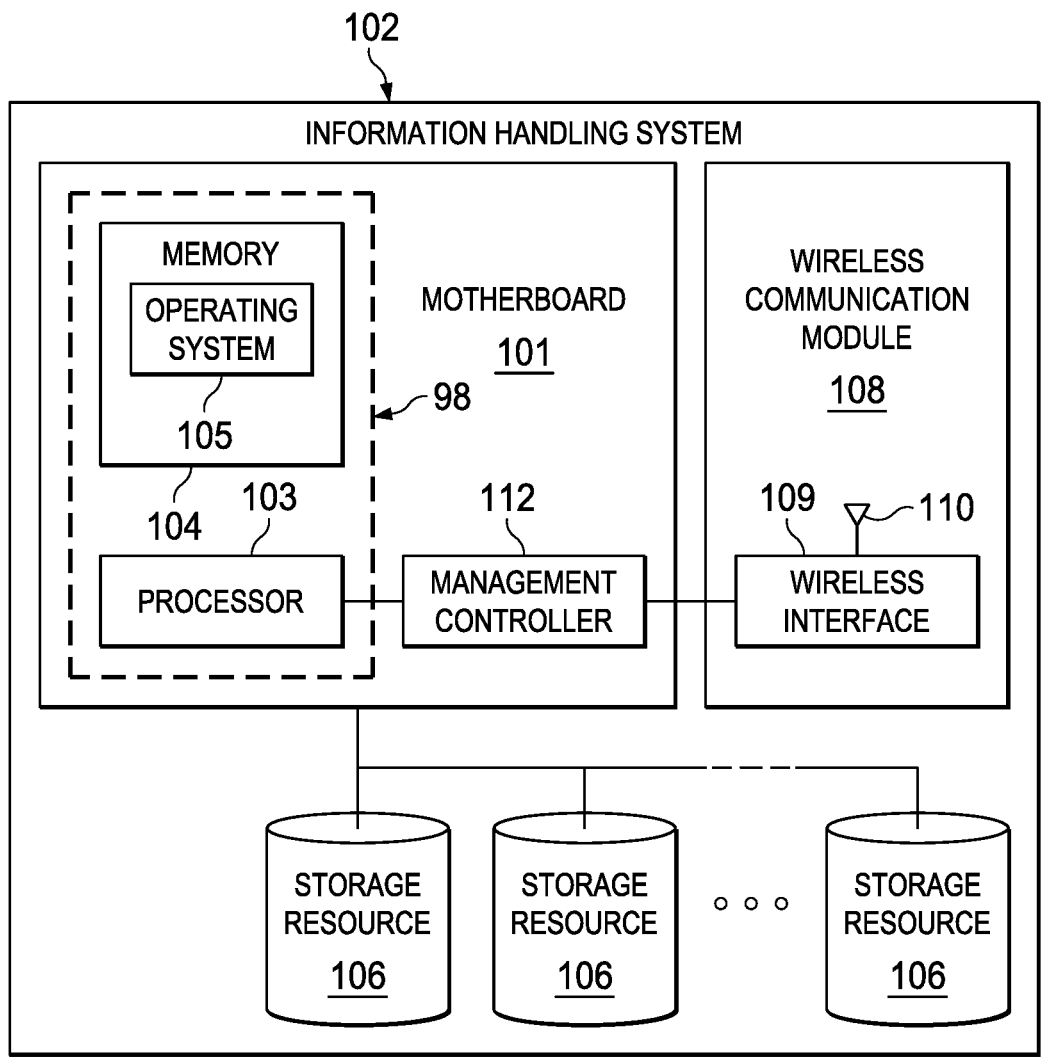
FIG. 1 illustrates a block diagram of selected components of an example information handling system, in accordance with embodiments of the present disclosure.

Preferred embodiments and their advantages are best understood by reference to FIGS. 1-8, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

The terms "wireless transmissions" and "wireless communication" may be used to refer to all types of electromagnetic communications which do not require a wire, cable, or other types of conduits. Examples of wireless transmissions which may be used include, but are not limited to, Wireless Fidelity (Wi-Fi), short-range wireless communication technologies (e.g., proximity card, Radio-Frequency Identification (RFID), Near Field Communication (NFC), BLUETOOTH, ISO 14443, ISO 15693, or other suitable standard), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

For the purpose of this disclosure, "short-range wireless communications technology" refers to any suitable communications transport, protocol, and/or standard allowing two or more suitably-configured devices to communicate via wireless transmissions provided that such devices are within approximately one meter of each other. Examples of short-range communications technologies include, without limitation, BLUETOOTH Class 3, near field communication (NFC), radio frequency identification (RFID), proximity card, vicinity card, ISO 14443, and ISO 15693.

FIG. 1 illustrates a block diagram of an example of an information handling system 102. In some embodiments, information handling system 102 may comprise a server. In other embodiments, information handling system 102 may comprise networking equipment for facilitating communication over a communication network. In yet other embodiments, information handling system 102 may comprise a personal computer, such as a laptop, notebook, or desktop computer. In yet other embodiments, information handling system 102 may be a mobile device sized and shaped to be readily transported and carried on a person of a user of information handling system 102 (e.g., a smart phone, a tablet computing device, a handheld computing device, a personal digital assistant, etc.).

As shown in FIG. 1, information handling system 102 may include a motherboard 101, one or more storage resources 106, and a wireless communication module 108. Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, a memory 104 communicatively coupled to processor 103, one or more storage resources 106 communicatively coupled to processor 103, and a management controller 112 communicatively coupled to processor 103. In operation, processor 103 and memory 104 may comprise at least a portion of a host system 98 of information handling system 102.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a storage resource 106, memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 105. Operating system 105 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 105. In addition, operating system 105 may include all or a portion of a network stack for network communication via a network interface. Active portions of operating system 105 may be transferred to memory 104 for execution by processor 103. Although operating system 105 is shown in FIG. 1 as stored in memory 104, in some embodiments operating system 105 may be stored in storage media accessible to processor 103 (e.g., a storage resource 106), and active portions of operating system 105 may be transferred from such storage media to memory 104 for execution by processor 103.

A management controller 112 may be communicatively coupled to processor 103 and may comprise any system, device, or apparatus configured to facilitate management and/or control of components of information handling system 102, information handling systems modularly coupled within, and/or one or more of its component information handling resources. Management controller 112 may be configured to issue commands and/or other signals to manage and/or control information handling resources of information handling system 102. Management controller 112 may comprise a microprocessor, microcontroller, DSP, ASIC, field programmable gate array ("FPGA"), EEPROM, or any combination thereof.

In addition or alternatively, management controller 112 may also provide a management console for user/administrator access to these functions. For example, management controller 112 may provide for communication with a user interface, permitting a user to interact with management controller 112 and configure control and management of components of information handling system 102 by management controller 112. As another example, management controller 112 may act as a proxy and establish communication between two information handling resources by either configuring them to directly couple to each other or transfer information by receiving information from one information handling resource, processing the information if needed, and then transferring the information to the other information handling resource. As a further example, management controller 112 may implement Web Services Management ("WS-MAN") or another suitable management protocol permitting a user to remotely access a management controller 112 to configure information handling system 102 and its various information handling resources. In such embodiments, management controller 112 may interface with a network interface separate from a traditional network interface of information handling system 102, thus allowing for "out-of-band" control of information handling system 102, such that communications to and from management controller 112 are communicated via a management channel physically isolated from an "in band" communication channel with the traditional network interface. Thus, for example, if a failure occurs in information handling system 102 that prevents an administrator from interfacing with information handling system 102 via a traditional network interface and/or user interface (e.g., operating system failure, power failure, etc.), the administrator may still be able to monitor and/or manage information handling system 102 (e.g., to diagnose problems that may have caused failure) via management controller 112. In the same or alternative embodiments, management controller 112 may allow an administrator to remotely manage one or more parameters associated with operation of information handling system 102 and its various information handling resources (e.g., power usage, processor allocation, memory allocation, security privileges, etc.). In certain embodiments, management controller 112 may include or may be an integral part of a chassis management controller (CMC), a baseboard management controller (BMC), Dell Remote Access Controller (DRAC) or an Integrated Dell Remote Access Controller (iDRAC).

Storage resources 106 may be communicatively coupled to processor 103, and may include any system, device, or apparatus configured to retain program instructions and/or data for a period of time (e.g., computer-readable media). Storage resources 112 may include hard disk drives, magnetic tape libraries, optical disk drives, magneto-optical disk drives, compact disk drives, compact disk arrays, disk array controllers, and/or any other system, apparatus or device operable to store media.

Wireless communication module 108 may be communicatively coupled to management controller 112 and may comprise any suitable system, apparatus, or device operable to serve as an interface between management controller 112 and another information handling system and/or a network. As shown in FIG. 1, wireless communication module 108 may comprise a wireless interface 109 communicatively coupled to management controller 112 and an antenna 110. Wireless interface 109 may enable information handling system 102 to communicate using any suitable transmission protocol and/or standard. In some embodiments, wireless interface 109 may be configured to communicate with another information handling system (e.g., a tablet, notebook, hand-held computer, mobile telephony device, etc.) via wireless transmissions, thus allowing a user of such other information handling system to perform management operations on management controller 112 via such other information handling system and wireless interface 109. In particular embodiments, wireless interface 109 may be configured to communicate with another information handling system via Wi-Fi and/or a short-range wireless communications technology. In these and other embodiments, wireless interface 109 may comprise a network interface card, or "NIC."

Antenna 110 may be communicatively coupled to wireless interface 109, and may comprise any system, device, or apparatus configured to convert electric power into radio waves, and vice versa.

In addition to motherboard 101, processor 103, storage resources 106, management controller 112, wireless communication module 108, wireless interface 109, and antenna 110, information handling system 102 may include one or more other information handling resources.

Figure 2:
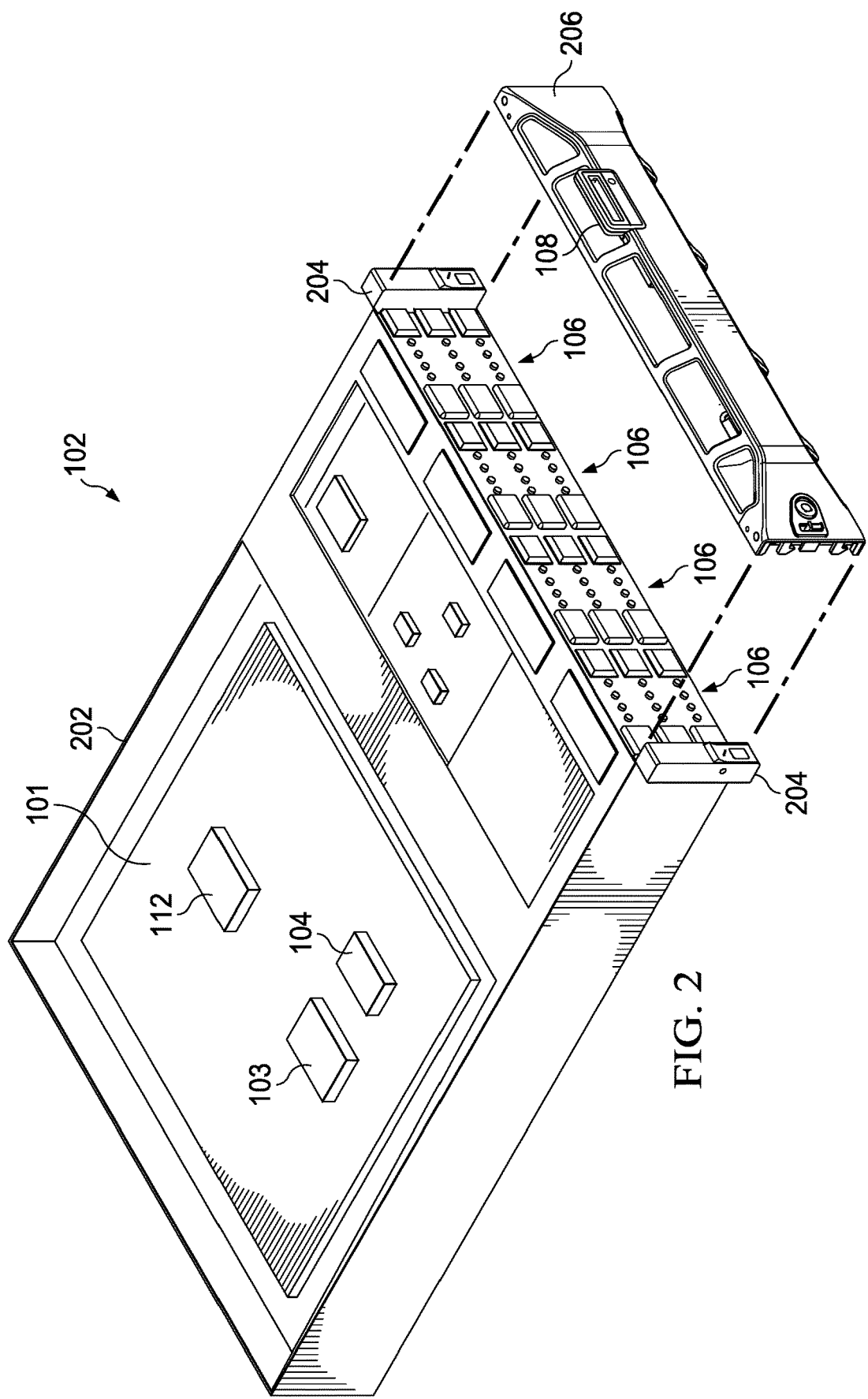
FIG. 2 illustrates a perspective view of selected components of the example information handling system of FIG. 1, in accordance with embodiments of the present disclosure.

FIG. 2 illustrates a perspective view of selected components of information handling system 102, in accordance with embodiments of the present disclosure. As shown in FIG. 2, information handling system 102 may comprise a housing 202 to house components of information handling system 102. In some embodiments, housing 202 may include a chassis or other enclosure including one or more mechanical features for supporting the various components of information handling system 102. In other embodiments, housing 202 may comprise a drawer or tray configured to be inserted into or removed from a server rack for housing multiple information handling systems.

As shown in FIG. 2, housing 202 may include ears 204 and a bezel 206. Bezel 206 may comprise any suitable mechanical structure for covering a front portion of information handling system 102. For example, bezel 206 may cover storage resources 106 for purposes of security and/or aesthetics. As described in greater detail below, bezel 206 may be readily detachable from the remainder of chassis 202 via ears 204. Bezel 206 may also include one or more mechanical features for housing wireless communication module 108.

An ear 204 may include one or more mechanical features for mechanically coupling bezel 206 to the remainder of housing 202 via corresponding mechanical features of bezel 206. In addition, as described in greater detail below, at least one ear 204 and bezel 206 may include corresponding electrically-conductive components permitting wireless communication module 108 to draw power, provide alerts, and/or communicatively couple to management controller 112 when bezel 206 is engaged with ears 204. In embodiments in which housing 202 comprises a drawer or sled, ears 204 may comprise mechanical components to allow a user to slide housing 202 into or out of a rack.

Figure 3A:
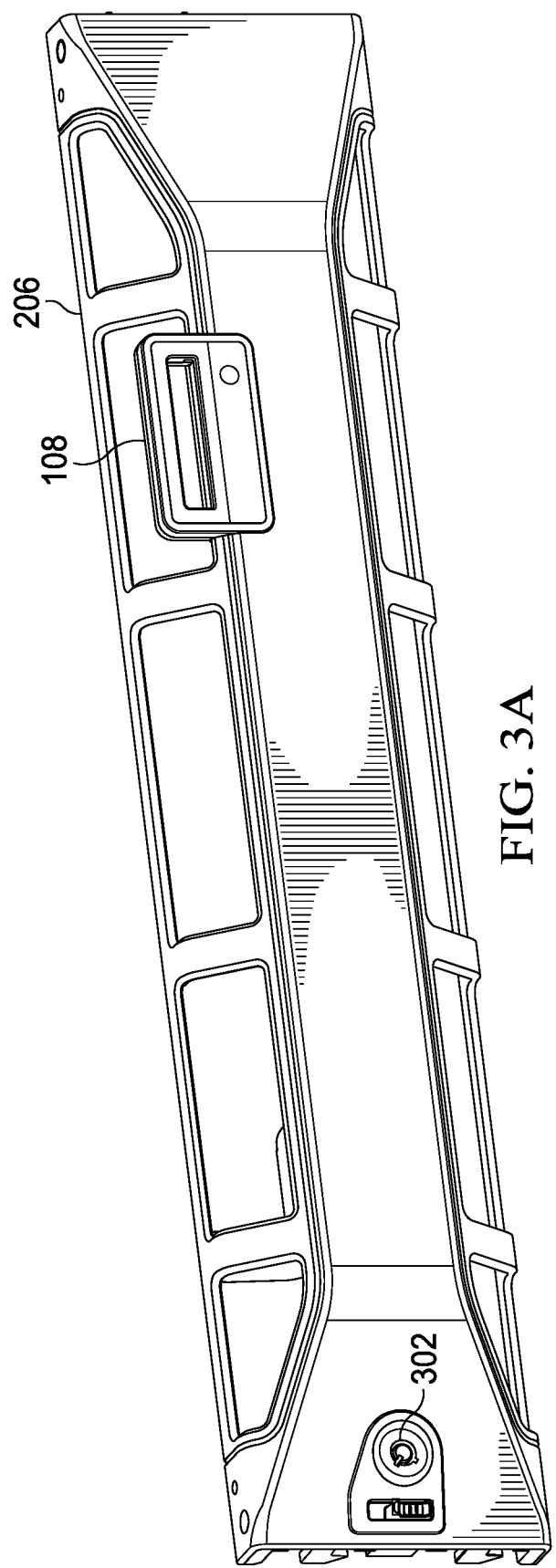
FIGS. 3A and 3B illustrate elevation views of opposite sides of a bezel, in accordance with embodiments of the present disclosure.
Figure 3B:
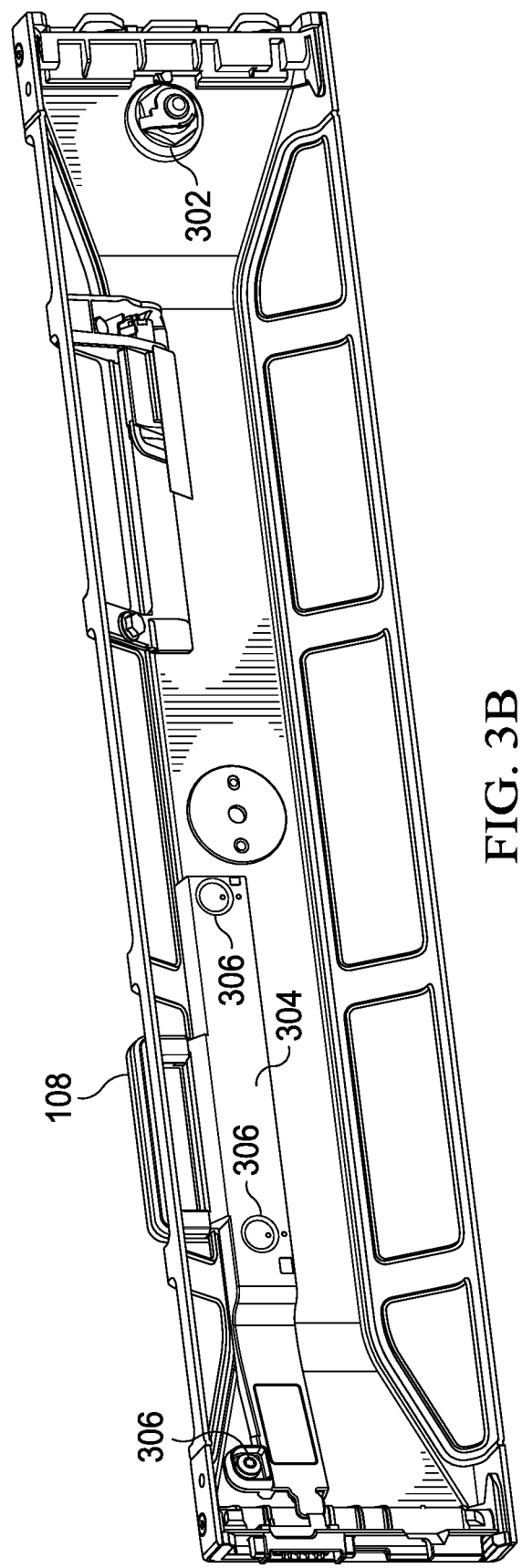

FIGS. 3A and 3B illustrate elevation views of opposite sides of bezel 206, in accordance with embodiments of the present disclosure. FIG. 3A depicts a front of bezel 206 (e.g., the side facing to the exterior of housing 202 when bezel 206 is engaged with ears 204) while FIG. 3B depicts a rear of bezel 206 (e.g., the side facing to the interior of housing 202 when bezel 206 is engaged with ears 204). As shown in FIGS. 3A and 3B, bezel 206 may comprise a lock 302 which may allow a user to mechanically manipulate lock 302 (e.g., with a key) to engage bezel 206 with one of ears 204 to secure bezel 206 in place. Further, as shown in FIG. 3B, wireless communication module 108 may include a cover 304 for covering components (e.g., wireless interface 109, antenna 110) of wireless communication module 108, and such cover 304 may be mechanically coupled to bezel 206 via one or more structural features 306 (e.g., guides, posts, screws, snaps, fasteners, etc.), thus supporting components of wireless communication module 108 within bezel 206. Including wireless communication module 108 within bezel 206 may allow for ease of access, as wireless communication module 108 may be accessed by another information handling system external to information handling system 102 without removing bezel 206. Accordingly, this may provide access to wireless communication module 108 without the need of removing bezel 206, as might be the case if wireless communication module 108 were internal to information handling system 102, and which might compromise security of information handling system 102.

In embodiments in which wireless communication capability is not desired, wireless communication module 108 may not be present in bezel 206, and such a bezel 206 without a wireless communication module 108 may be engaged with ears 204 (and, if desired, locked into place with lock 302 for security purposes).

Figure 4:
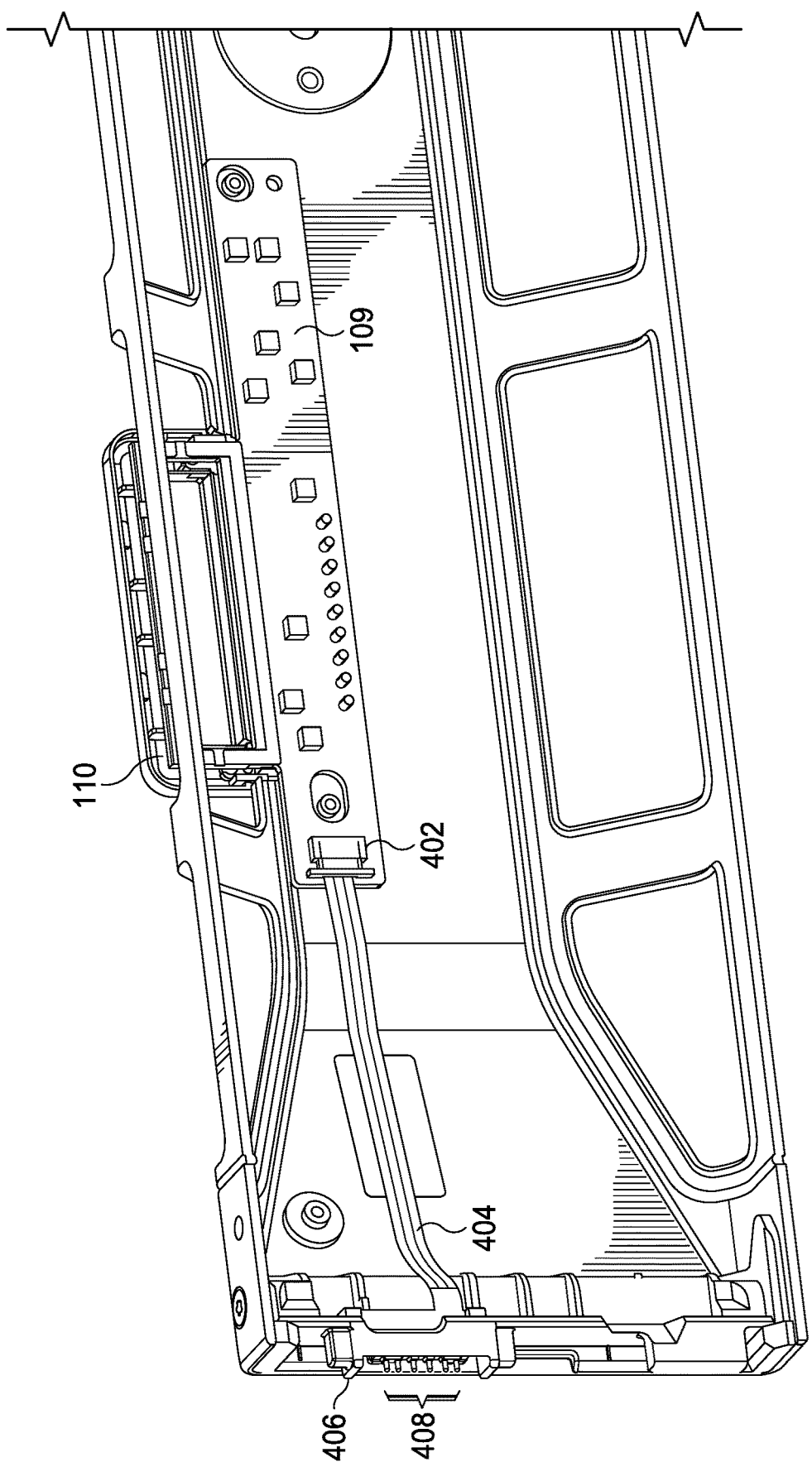
FIG. 4 illustrates detail of the view of FIG. 3B with a cover of a wireless communication module removed, in accordance with embodiments of the present disclosure.

FIG. 4 illustrates detail of the view of FIG. 3B with cover 304 of wireless communication module 108 removed for purposes of clarity and exposition, in accordance with embodiments of the present disclosure. As shown in FIG. 4, wireless interface 109 and antenna 110 may reside in bezel 206. Wireless interface 109 may comprise a connector 402 configured to electrically and mechanically couple a flexible circuit board 404 having a plurality of conductive traces to wireless interface 109. In some embodiments, a cable or harness of electrically-conductive wires may be used in lieu of flexible circuit board 404. The conductive traces of flexible circuit board 404 (or the wires of a cable or harness used in lieu thereof) may terminate into a connector 406 at an edge of bezel 206. In some embodiments, connector 406 may comprise a plurality of electrically conductive, spring-loaded pins 408 electrically coupled to conductive traces of flexible circuit board 404 (or the wires of a cable or harness used in lieu thereof).

Figure 5:
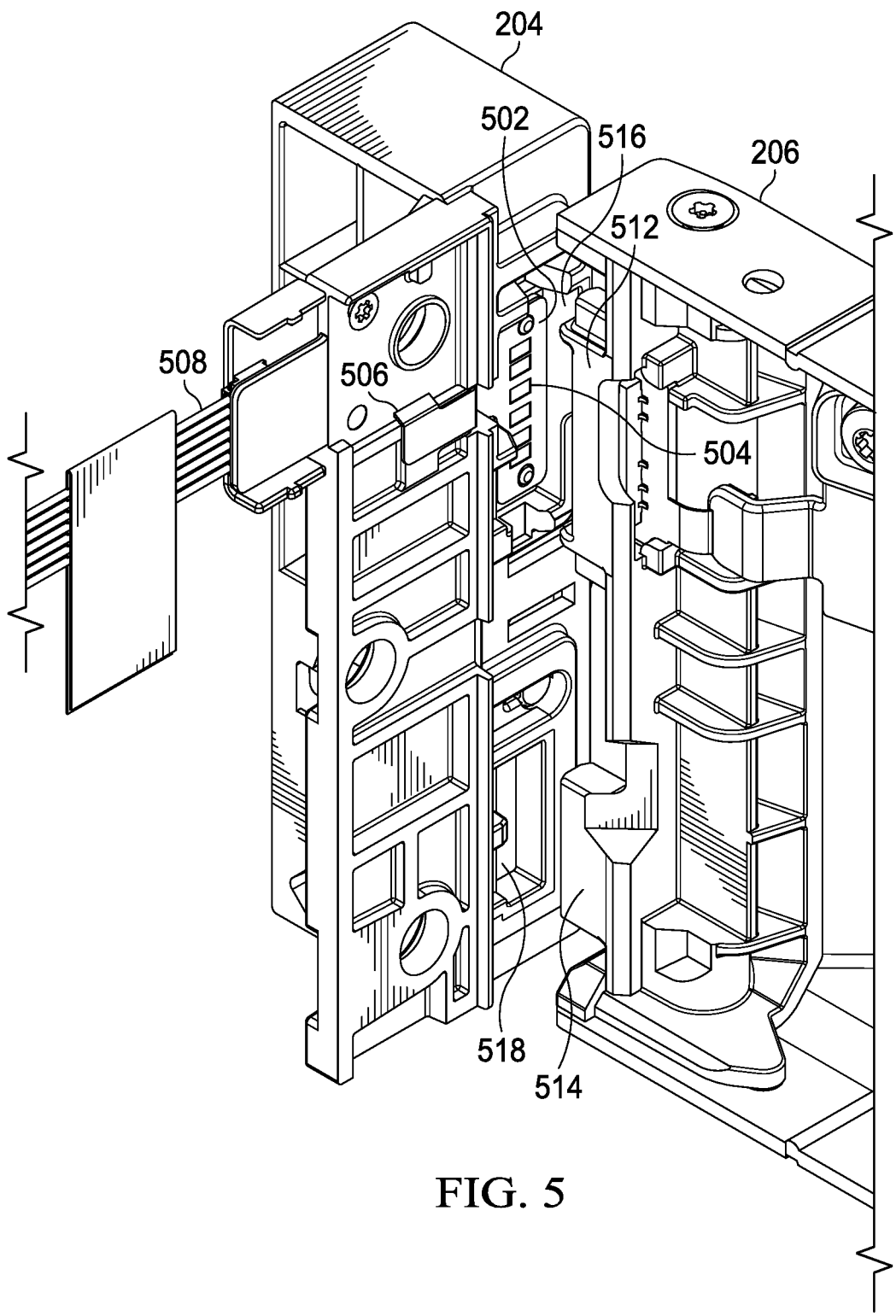
FIG. 5 illustrates detail of a bezel engaging with an ear, in accordance with embodiments of the present disclosure.

FIG. 5 illustrates detail of bezel 206 engaging with an ear 204, in accordance with embodiments of the present disclosure. As shown in FIG. 5, engagement of bezel 206 to the remainder of housing 202 may begin with a user "toe-ing in" mechanical features 512 and 514 of a first end of bezel 206 with corresponding mechanical features 516 and 518 of an ear 204. Such mechanical features may provide mechanical guiding, assisting the user in electrically coupling spring-loaded pins 408 of connector 406 to corresponding contacts 504 of a connector 502 integral to ear 204. Contacts 504 may be configured such that they prevent shorting of pins during insertion, removal, or other movement of bezel 206. For example, contacts 504 may be formed such that power and/or ground pins disconnect before any pin 408 can short to a contact 504 not intended for such pin 408.

Mechanical feature 512 may include or may support connector 408. Likewise, mechanical feature 516 may include or may support connector 502. However, in embodiments in which a bezel does not include wireless interface 109 or other information handling resource, mechanical feature 512 may be absent of a connector such as connector 406.

Contacts 504 of connector 502 may be electrically coupled to conductive traces of a flexible circuit board 506 (or the wires of a cable or harness used in lieu thereof) which in turn may terminate into a cable 508 configured to electrically couple to conductive traces of a flexible circuit board 506 (or the wires of a cable or harness used in lieu thereof) to a cable 508 (or wiring harness) of electrically conductive wires. After the first end of bezel 206 is engaged with a first ear 204, engagement of bezel 206 to the remainder of housing 202 may be completed by engagement of bezel 206 to a second ear 204.

Figure 6:
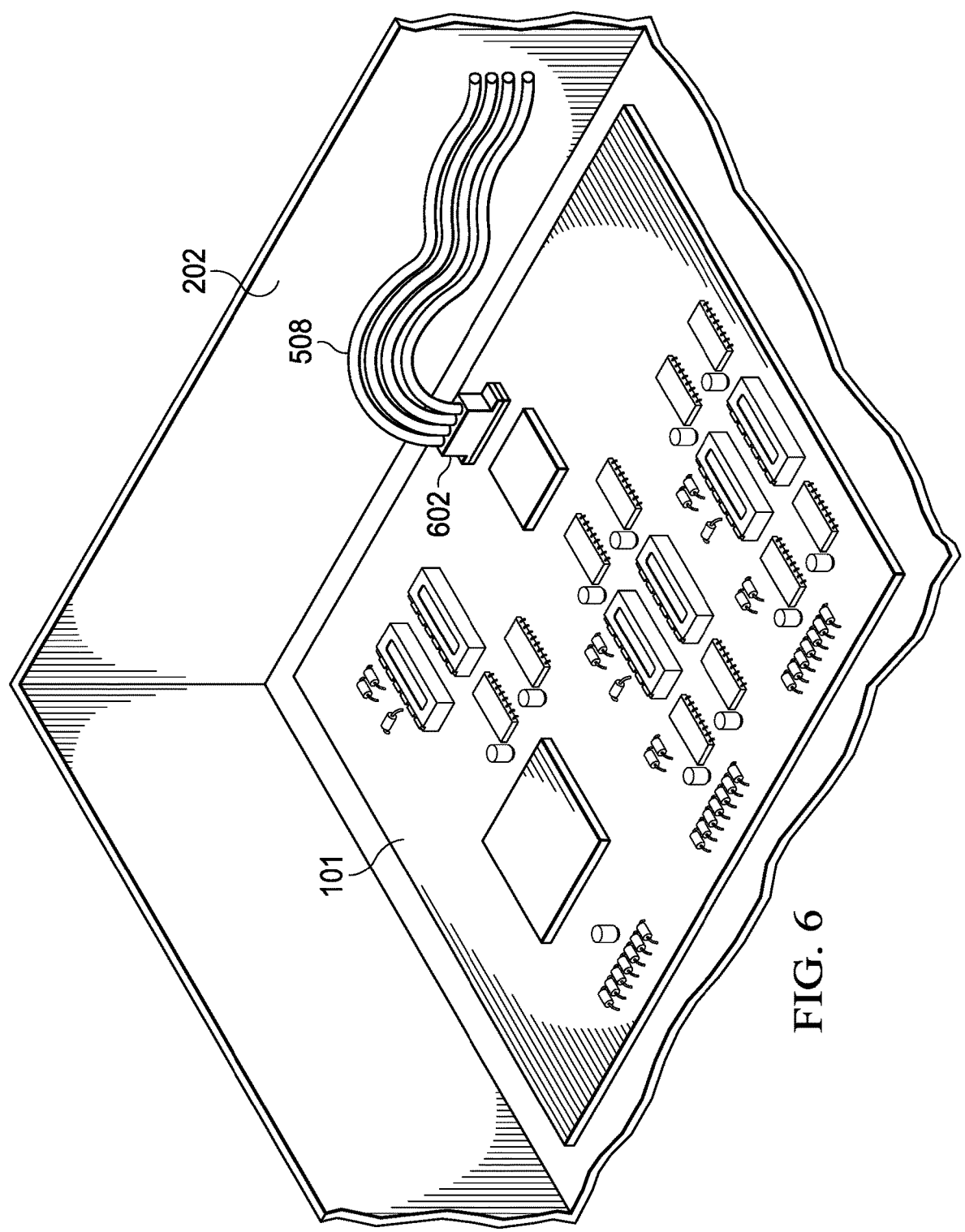
FIG. 6 illustrates detail of a cable coupling to a motherboard, in accordance with embodiments of the present disclosure.

FIG. 6 illustrates detail of cable 508 coupling to motherboard 101, in accordance with embodiments of the present disclosure. As shown in FIG. 6, wires of cable 508 may terminate into a connector 602 having electrically-conductive pins for coupling to corresponding wires of cable 508. Such electrically-conductive pins may in turn be electrically coupled to conductive traces of motherboard 101 which are coupled to management controller 112, thus providing for an electrical communication pathway between management controller 112 and wireless interface 109.

Although the foregoing discussion contemplates the communicative coupling of wireless communication module 108 housed in bezel 206 to a management controller 112, systems and methods similar or identical to those described herein may be utilized for locating a wireless communication module similar to that of wireless communication module 108 anywhere within information handling system 102.

Figure 7:
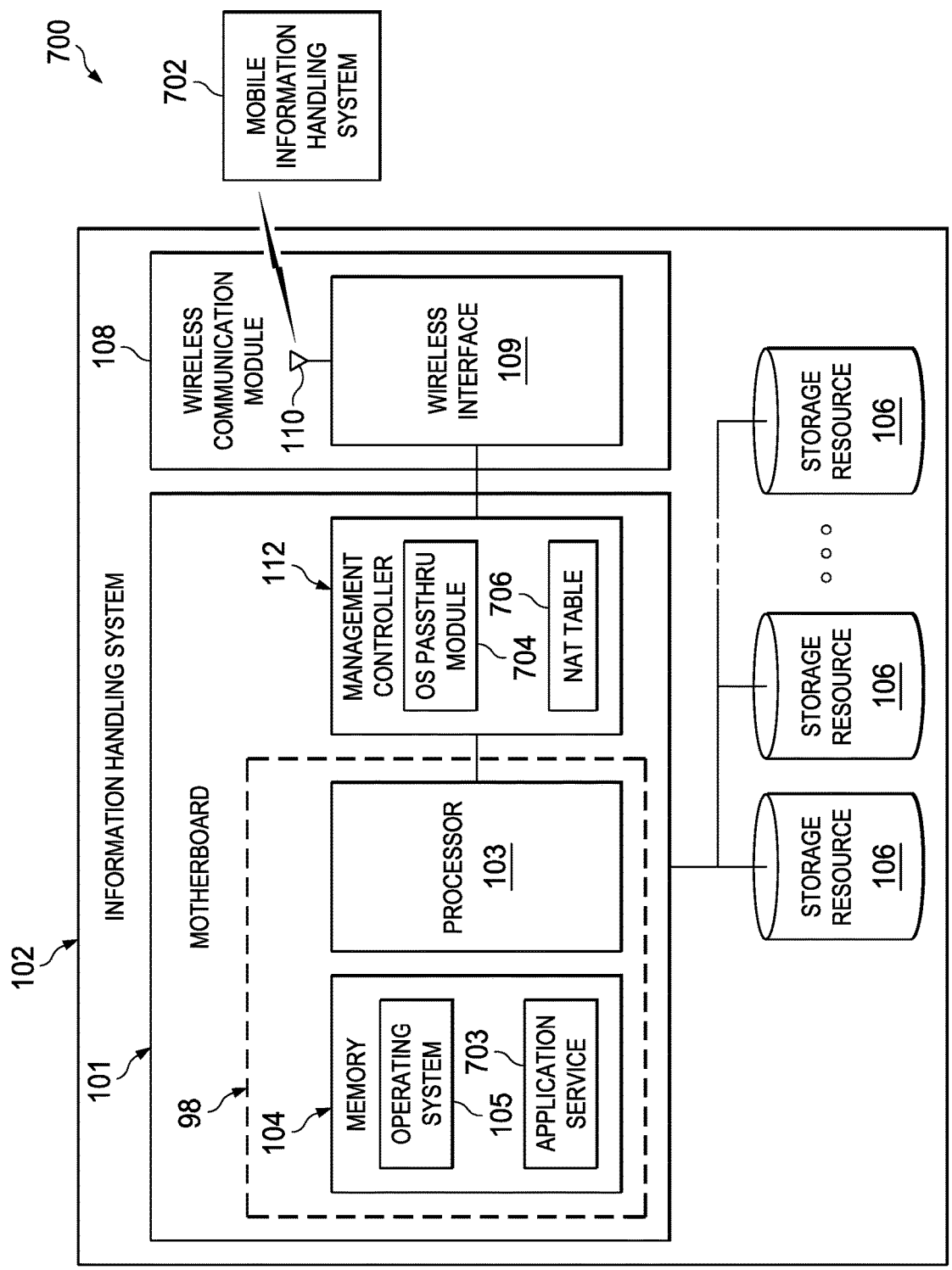
FIG. 7 illustrates a system for host system management of an information handling system via a mobile device, in accordance with embodiments of the present disclosure.

FIG. 7 illustrates a system 700 for host system management of information handling system 102 via a mobile information handling system 702, in accordance with embodiments of the present disclosure. As shown in FIG. 7, system 700 may include information handling system 102 as described in the foregoing figures and description and a mobile information handling system 702. For purposes of exposition, information handling systems 102 and 702 within system 700 are shown with only a very small portion of their components.

Mobile information handling system 702 may comprise a tablet, notebook, hand-held computer, mobile telephony device, or other suitable highly-portable device, and may be configured to execute system management software for interfacing with and managing information handling system 102 via its management controller 112. Mobile information handling system 702 may be configured with wireless communication features (e.g., Wi-Fi, BLUETOOTH, etc.) in order to communicate with management controller 112 via wireless communication module 110.

As shown in FIG. 7, management controller 112 may include an operating system (OS) passthru module 704 and a network address translation (NAT) table 706 to enable host system management of information handling system 102 via a mobile information handling system 702, as described in greater detail herein. OS passthru module 704 may comprise any program of executable instructions, or aggregation of programs of executable instructions, configured to manage and/or control host system management of information handling system 102 via mobile information handling system 702, as described in greater detail below.

NAT table 706 may include any table, map, list, database, or other suitable data structure that may be used by management controller 112 to translate network addresses (e.g., Internet Protocol (IP) addresses), as further described herein.

In operation, a user of mobile information handling system 702 desiring to manage host system 98 of information handling system 102 may cause mobile information handling system 702 to couple to wireless communication module 108 via wireless transmissions. For example, in some embodiments, wireless communications features of wireless communication module 108 may be turned off by default for security purposes. To cause mobile information handling system 702 to couple to wireless communication module 108 via wireless transmissions, the user may press a user interface button associated with wireless communication module 108 (not shown) which causes wireless communication module 108 to enable wireless communication features (e.g., Wi-Fi, BLUETOOTH, etc.). Once wireless communication features of wireless communication module 108 are enabled, mobile information handling system 702 and wireless communication module 108 may initially wirelessly couple to each other via a short-range wireless communication mechanism (e.g., BLUETOOTH), which may then be transferred over to a Wi-Fi channel between mobile information handling system 702 and management controller 112. To enable Wi-Fi communication, each of management controller 112 and mobile information handling system 702 may be assigned a known network address, such as an IP address.

Once a Wi-Fi channel is established between management controller 112 and mobile information handling system 702, a handshake process may be carried out between the two devices, in order to authenticate mobile information handling system 702 for use with management controller 112. Once authenticated, mobile information handling system 702 may communicate a request to management controller 112 to enable OS passthru module 704, in response to which management controller 112 may enable OS passthru module 704.

Once enabled, OS passthru module 704 may expose a virtual network interface card (e.g., a virtual Universal Serial Bus (USB) network interface card) to operating system 105 executing on host system 98. Upon becoming aware of the virtual network interface card, operating system 105 may provision the appropriate operating system drivers for the virtual network interface card and configure the virtual network interface card with a known network address (e.g., IP address unique from that of management controller 112 and mobile information handling system 702).

Once the virtual network interface card is provisioned, an application service 708 may execute on operating system 105. Application service 708 may comprise any program of executable instructions, or aggregation of programs of executable instructions, configured to monitor the virtual network interface for instructions from mobile information handling system 702, execute such instructions, and/or communicate information to mobile information handling system 702 in response to such instructions.

When communicating commands to application service 708, mobile information handling system 702 may attempt to communicate using a network address of host system 98. Because such network address may not exist on the subnet comprising mobile information handling system 702 and management controller 112, management controller 112 may perform network address translation using NAT table 706 to convert from a network address of one subnet to another. Management controller 112 may perform a similar translation for communications from application service 708 to mobile information handling system 702.

Figure 8:
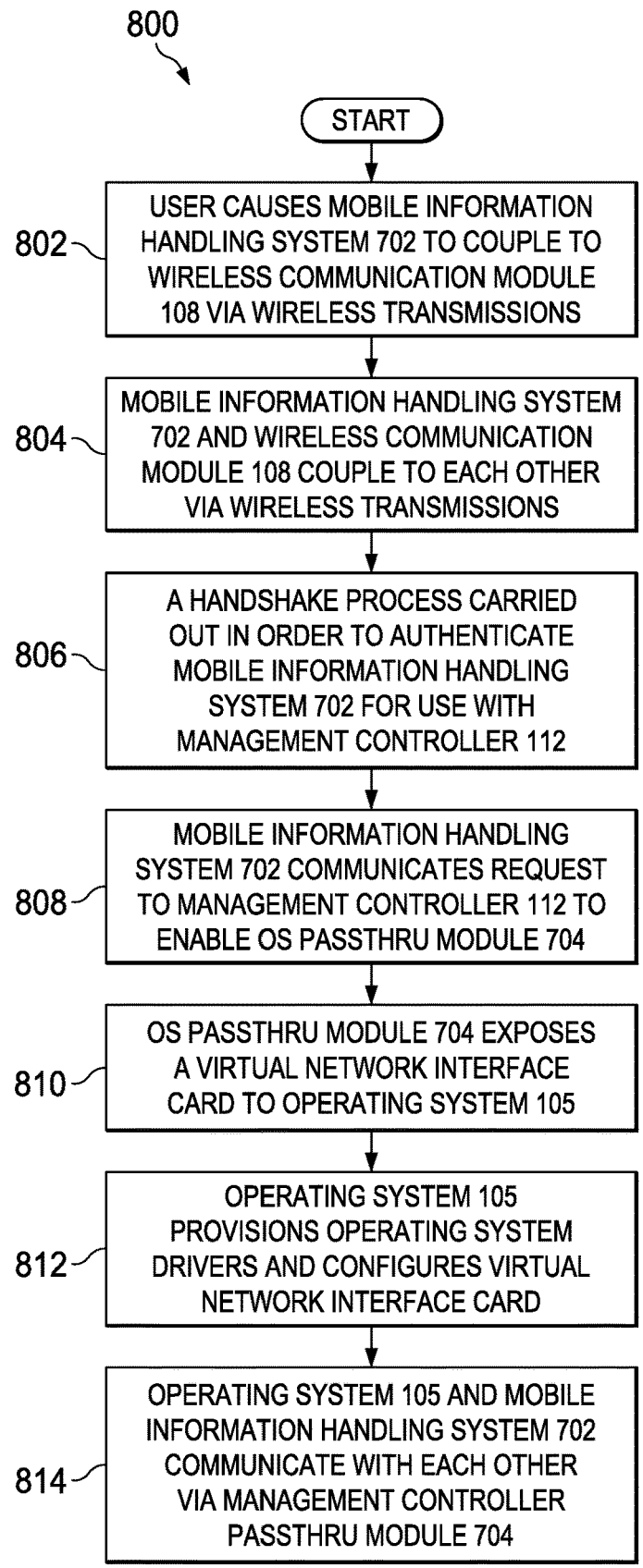
FIG. 8 illustrates a flow chart of an example method for host system management of an information handling system via a mobile device, in accordance with embodiments of the present disclosure.

FIG. 8 illustrates a flow chart of an example method 800 for host system management of information handling system 102 via mobile information handling system 702, in accordance with embodiments of the present disclosure. According to some embodiments, method 800 may begin at step 802. As noted above, teachings of the present disclosure may be implemented in a variety of configurations of system 700 and information handling system 102. As such, the preferred initialization point for method 800 and the order of the steps comprising method 800 may depend on the implementation chosen.

At step 802, a user of mobile information handling system 702 desiring to manage host system 98 of information handling system 102 may cause mobile information handling system 702 to couple to wireless communication module 108 via wireless transmissions. At step 804, once wireless communication features of wireless communication module 108 are enabled, mobile information handling system 702 and wireless communication module 108 may couple to each other via wireless transmissions (e.g., Wi-Fi). At step 806, once a Wi-Fi channel is established between management controller 112 and mobile information handling system 702, a handshake process may be carried out between the two devices, in order to authenticate mobile information handling system 702 for use with management controller 112. At step 808, once authenticated, mobile information handling system 702 may communicate a request to management controller 112 to enable OS passthru module 704, in response to which management controller 112 may enable OS passthru module 704.

At step 810, once enabled, OS passthru module 704 may expose a virtual network interface card (e.g., a virtual Universal Serial Bus (USB) network interface card) to operating system 105 executing on host system 98. At step 812, upon becoming aware of the virtual network interface card, operating system 105 may provision the appropriate operating system drivers for the virtual network interface card and configure the virtual network interface card with a known network address (e.g., IP address unique from that of management controller 112 and mobile information handling system 702). At step 814, once the virtual network interface card is provisioned, operating system 105 and mobile information handling system 702 may communicate with each other as described above via management controller passthru module 704, including with network address translation enabled by NAT table 706.

Although FIG. 8 discloses a particular number of steps to be taken with respect to method 800, method 800 may be executed with greater or fewer steps than those depicted in FIG. 8. In addition, although FIG. 8 discloses a certain order of steps to be taken with respect to method 800, the steps comprising method 800 may be completed in any suitable order.

Method 800 may be implemented using system 700 or any other system operable to implement method 800. In certain embodiments, method 800 may be implemented partially or fully in software and/or firmware embodied in computer-readable media.

Using systems and methods described above, a mobile application executing on mobile information handling system 702 may instruct application service 708 to perform any tasks, including sending/receiving data, files and configuration changes. This enables building of a simple mobile application interface to push or pull data with the complexity abstracted within the mobile app. Example tasks that could be performed include, without limitation, application or operating system updates, extraction of troubleshooting information, or performance of any other management task without requiring an on-site technician to use a laptop, keyboard-video-mouse device, or any other similar device. Application service 708 may be provisioned during deployment of information handling system 102 and the corresponding mobile application may easily be deployed to mobile information handling system 702.

It is noted that for the methods and systems described above to enable the mobile application of the mobile information handling system to couple to the management controller via a Wi-Fi channel and communicate with the operating system of other information handling system, the virtual network interface card and all related drivers and application services associated with the virtual network interface card may need to be setup ahead of time (e.g., factory configured).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   a management controller communicatively coupled to the processor and configured to provide out-of-band management of the information handling system; and
   an interface for communicatively coupling the management controller to a second information handling system external to the information handling system for out-of-band management of the information handling system, wherein the interface is configured to:
   enable a short-range wireless communication mechanism in response to a physical interaction;
   couple the management controller to the second information handling system via the short-range wireless interface; and
   transfer the coupling between the management controller and the second information handling system to a Wi-Fi interface;
   wherein the management controller is further configured to enable communication between the second information handling system and an operating system executing on the processor, such that the second information handling system is operable to provide out-of-band management of the operating system via the management controller.

2. The information handling system of claim 1, wherein the physical interaction comprises a button being pressed.

3. The information handling system of claim 1, wherein the management controller is further configured to authenticate communication between the second information handling system and the management controller prior to enabling communication between the second information handling system and the operating system.

4. The information handling system of claim 1, wherein the management controller is configured to expose a virtual network interface card to the operating system, and the operating system is configured to communicate with the second information handling system via the virtual network interface card.

5. The information handling system of claim 4, wherein the management controller is configured to translate network addresses of communications between the second information handling system and the operating system.

6. The information handling system of claim 1, wherein the interface is integral to a bezel mechanically coupled to a chassis housing the processor and the management controller.

7. The information handling system of claim 1, wherein the short-range wireless communication mechanism comprises a Bluetooth communication mechanism.

8. A method comprising:
communicatively coupling a processor to a management controller configured to provide out-of-band management of an information handling system;
communicatively coupling the management controller to a second information handling system external to the information handling system for out-of-band management of the information handling system via an interface, wherein the interface is configured to:
enable a short-range wireless communication mechanism in response to a physical interaction;
couple the management controller to the second information handling system via the short-range wireless interface; and
transfer the coupling between the management controller and the second information handling system to a Wi-Fi interface; and
enabling communication between the second information handling system and an operating system executing on the processor via the management controller, such that the second information handling system provides out-of-band management of the operating system via the management controller.

9. The method of claim 8, wherein the physical interaction comprises a button being pressed.

10. The method of claim 8, further comprising authenticating, with the management controller, communication between the second information handling system and the management controller prior to enabling communication between the second information handling system and the operating system.

11. The method of claim 8, further comprising exposing, by the management controller, a virtual network interface card to the operating system such that the operating system communicates with the second information handling system via the virtual network interface card.

12. The method of claim 11, further comprising translating, by the management controller, network addresses of communications between the second information handling system and the operating system.

13. The method of claim 8, wherein the interface is integral to a bezel mechanically coupled to a chassis housing the processor and the management controller.

14. An article of manufacture comprising:
a non-transitory computer-readable medium; and
computer-executable instructions carried on the computer-readable medium, the instructions readable by a processor, the instructions, when read and executed, for causing the processor to, in a first information handling system comprising a management controller communicatively configured to provide out-of-band management of the first information handling system:
communicatively couple a host system processor of the first information handling system to the management controller configured to provide out-of-band management of the first information handling system;
communicatively couple the management controller to a second information handling system external to the first information handling system for out-of-band management of the first information handling system via an interface, wherein the interface is configured to:
enable a short-range wireless communication mechanism in response to a physical interaction;
couple the management controller to the second information handling system via the short-range wireless interface; and
transfer the coupling between the management controller and the second information handling system to a Wi-Fi interface; and
enable communication between the second information handling system and an operating system executing on the host system processor via the management controller, such that the second information handling system is operable to provide out-of-band management of the operating system via the management controller.

15. The article of claim 14, wherein the physical interaction comprises a button being pressed.

16. The article of claim 14, the instructions for further causing the processor to authenticate, with the management controller, communication between the second information handling system and the management controller prior to enabling communication between the second information handling system and the operating system.

17. The article of claim 14, the instructions for further causing the processor to expose, by the management controller, a virtual network interface card to the operating system such that the operating system is configured to communicate with the second information handling system via the virtual network interface card.

18. The article of claim 17, the instructions for further causing the processor to translate, by the management controller, network addresses of communications between the second information handling system and the operating system.

19. The article of claim 14, wherein the interface is integral to a bezel mechanically coupled to a chassis housing the processor and the management controller.

* * * * *